(12) United States Patent
Van Rossum et al.

(10) Patent No.: US 10,081,689 B2
(45) Date of Patent: Sep. 25, 2018

(54) METHOD FOR PREPARING A DRY CATIONIC HYDROGEL POLYMER PRODUCT, POLYMER PRODUCT AND ITS USE

(71) Applicant: Kemira Oyj, Helsinki (FI)

(72) Inventors: Ronald Van Rossum, Maassluis (NL); Susanna Holappa, Helsinki (FI); Lasse Kyllönen, Espoo (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 15/526,765

(22) PCT Filed: Nov. 17, 2015

(86) PCT No.: PCT/FI2015/050797
§ 371 (c)(1),
(2) Date: May 15, 2017

(87) PCT Pub. No.: WO2016/079383
PCT Pub. Date: May 26, 2016

(65) Prior Publication Data
US 2017/0320979 A1   Nov. 9, 2017

(30) Foreign Application Priority Data

Nov. 17, 2014 (FI) ..................................... 20146003

(51) Int. Cl.

| | |
|---|---|
| *C08F 120/56* | (2006.01) |
| *C02F 11/14* | (2006.01) |
| *C08F 2/10* | (2006.01) |
| *C08F 2/32* | (2006.01) |
| *C08F 220/56* | (2006.01) |
| *C08F 6/00* | (2006.01) |
| *D21H 17/37* | (2006.01) |
| *D21H 21/10* | (2006.01) |
| *C02F 1/56* | (2006.01) |
| *C08F 4/40* | (2006.01) |

(52) U.S. Cl.
CPC .............. *C08F 120/56* (2013.01); *C02F 1/56* (2013.01); *C02F 11/14* (2013.01); *C08F 2/10* (2013.01); *C08F 2/32* (2013.01); *C08F 6/008* (2013.01); *C08F 220/56* (2013.01); *D21H 17/375* (2013.01); *D21H 21/10* (2013.01)

(58) Field of Classification Search
CPC .......... C08F 2/32; C08F 6/008; C08F 120/56; C08F 220/56; C02F 1/56; C02F 11/14
USPC ................... 524/801, 916; 525/217; 526/930
See application file for complete search history.

(56) References Cited

U.S. PATENT DOCUMENTS

| | | | | |
|---|---|---|---|---|
| 5,879,564 A | * | 3/1999 | Farinato .................... | C02F 1/56 210/734 |
| 6,117,938 A | * | 9/2000 | Farinato .................... | C02F 1/56 524/501 |
| 2004/0124154 A1 | | 7/2004 | Weir et al. | |
| 2007/0187331 A1 | | 8/2007 | Whittaker et al. | |
| 2008/0004405 A1 | | 1/2008 | Mori et al. | |

FOREIGN PATENT DOCUMENTS

JP   2014184406 A   10/2014

OTHER PUBLICATIONS

Finnish Patent and Registration Office, FI20146003, Search Report, dated Jun. 10, 2015.

* cited by examiner

*Primary Examiner* — Fred M Teskin
(74) *Attorney, Agent, or Firm* — Berggren LLP

(57) ABSTRACT

The invention relates to a method for preparing a dry cationic hydrogel polymer product. The method comprises polymerization of a reaction mixture comprising ethylenically unsaturated monomers in presence of water and initiator(s) by radical polymerization and obtaining a hydrogel polymer. The hydrogel polymer is comminuted by chopping or shredding, and dried, whereby a dry hydrogel polymer product in powder form is obtained. At least one cationic reverse phase emulsion polymer is added to the hydro polymer at the comminuting step. The invention relates also to a dry cationic hydrogel polymer composition prepared by the method and its use.

10 Claims, No Drawings

US 10,081,689 B2

METHOD FOR PREPARING A DRY CATIONIC HYDROGEL POLYMER PRODUCT, POLYMER PRODUCT AND ITS USE

PRIORITY

This application is a U.S national application of PCT-application PCT/FI2015/050797 filed on Nov. 17, 2015 and claiming priority of Finnish national application number FI 20146003 filed on Nov. 17, 2014, the contents of all of which are incorporated herein by reference.

The present invention relates to a method for preparing a dry cationic hydrogel polymer product, dry cationic hydrogel polymer product and use of hydrogel polymer product according to the preambles of the enclosed independent claims.

Water is the main constituent in sludges originating from wastewater treatment, and thereby effective dewatering of the sludge is one of the most important requirements in the sludge processing. The dry solids content of a dewatered sludge cake plays a major role in the process. Centrifuges are commonly used in dewatering of sludges. In centrifugal separation the sludge flocs are exposed to high shear forces, and it would be advantageous that the sludge flocs show good shear resistance in order to arrive in high solids content.

It is known that high molecular weight polymeric flocculants improve the shear-resistance of sludge flocs, when the flocculant is added to the sludge in the treatment process.

Cationic hydrogel polymers, such as cationic polyacrylamide, are used in various applications in different technical fields, also as flocculants in waste water treatment as described above. These polymers may be produced in dry particle form by polymerisation of an aqueous mixture of ethylenically unsaturated monomers, such as acrylamide, and a cationic monomer under appropriate reaction conditions. After the polymerisation the obtained cationic linear hydrogel polymer product is comminuted, e.g. shredded or chopped, for more efficient drying. The comminuted linear polymer product is dried, milled to a desired particle size and packed for storage and/or transport.

It has been observed that branched cationic polyacrylamides provide good technical performance in municipal sludge dewatering, both in sense of the floc strength and the dry solids content of the sludge from centrifugal separation.

However, soluble branched cationic polyacrylamides are mainly obtainable in two-phase form, e.g. in emulsion form, which has many disadvantages in comparison to dry products described above. For example, the dry polymer is more convenient to transport and store and it has a longer shelf life.

An object of the present invention is to minimise or even totally eliminate problems existing in the prior art.

One object of the present invention is to provide a method for preparing dry cationic hydrogel polymer products with novel and improved characteristics and/or properties.

Another object of the present invention is to provide a dry cationic hydrosoluble polymer product with novel characteristics and/or properties.

These objects are attained by the invention characterised by the features defined in the independent claims.

Some advantageous embodiments of the present invention are disclosed in the dependent claims.

Typical method according to the present invention for preparing a dry cationic hydrogel polymer product comprises at least the following:

polymerising a reaction mixture comprising ethylenically unsaturated monomers in presence of water and initiator(s) by radical polymerisation and obtaining a hydrogel polymer, comminuting the hydrogel polymer by chopping or shredding, and drying the hydrogel polymer, whereby a dry hydrogel polymer product in powder form is obtained, and adding at least one cationic reverse phase emulsion polymer to the hydrogel polymer at the comminuting step.

Typical dry cationic hydrosoluble polymer product according to the present invention is prepared by a method according to the present invention.

Now it has been surprisingly found that when at least one cationic reverse phase emulsion polymer is added to the hydrogel polymer at the comminuting step, the obtained dry polymer product provides benefits in application performance, for example improved solid-liquid separation in high shear centrifuge decanters. The obtained improvements are unexpectedly synergic, i.e. greater than could have been predicted on basis of the experience from the performance of the individual components.

In context of the present application "cationic reverse phase emulsion polymer" denotes a water-in-oil emulsion, where oil is the continuous phase surrounding separate water droplets, which water droplets comprise at least one dissolved cationic polymer and which droplets are randomly but evenly dispersed in the continuous phase. The cationic reverse phase emulsion polymer may be obtained by dissolving in water ethylenically unsaturated monomer(s), such as acrylamide, cationic monomer(s), as well as any optional comonomer(s). The aqueous mixture of monomers is emulsified or dispersed in the continuous oil phase, a polymerisation initiator, such as free radical initiator, is added to the reverse phase emulsion, and the polymerisation in the emulsified or dispersed water droplets is initiated. The reverse phase emulsion polymer may be stabilised by a surfactant system. The oil phase may usually comprise a water-insoluble hydrocarbon solution of surfactant(s). Examples of suitable surfactant systems are ethoxylated C12-16 alcohols, ethoxylated C10-16 alcohols, ethoxylated C12-14 alcohols or sorbitan fatty acid esters.

According to a preferable embodiment of the present invention the cationic reverse phase emulsion polymer is cationic polyacrylamide, which may have a charge density of 10-80 mol %, preferably 40-80 mol %, more preferably 60-80 mol %. It is possible to select the charge density of the polymer according to the use of the polymer product. For example, in sludge treatment polymers with high charge density, e.g. >50 mol %, are advantageous for treating processed sludges or biological sludges.

According to one preferable embodiment of the present invention the reverse phase emulsion polymer is cationic branched or cross-linked polyacrylamide, where the amount of monomeric cross-linker agent is <500 ppm, preferably <250 ppm, more preferably <100 ppm, calculated from the total weight of the monomers. Typical cross-linker agent may be, for example, divinyl benzene; tetraallylammonium chloride; allylacrylate or allylmethacrylate; diacrylate or dimethacrylate of glycol or polyglycol; butadiene; 1,7-octadiene; allylacrylamide or allylmethacrylamide; bisacrylamidoacetic acid; N,N'-methylene-bisacrylamide or polyol polyallylether, such as polyallylsaccharose and pentaerythritol triallylether. According to one preferable embodiment of the invention cross-linker agent is selected from the group comprising allylacrylamides; allyl-methacrylamides; bisacrylamidoacetic acid and N,N'-methylene-bisacrylamide. Even more preferably the cross-linking agent is N,N'-methylene-bisacrylamide. It is also possible to use a mixture of two or more cross-linking agents.

The cationic reverse phase emulsion polymer, such as polyacrylamide, may have an average molecular weight of 5 000 000-100 000 000 g/mol, preferably 10 000 000-50 000 000 g/mol, more preferably 15 000 000-20 000 000 g/mol. Molecular weight of linear polymer can be increased by cross-linking as described above. High molecular weight is advantageous for achieving strong flocs, which withstand high shear forces during processing. The molecular weights of structured polymers, such as branched and/or cross-linked polymers, are challenging to determine accurately. They often comprise a fraction of macromolecules of ultra-high molecular weight and non-linear topology. The molecular weight of this fraction may easily exceed $100 \times 10^6$ g/mol, which makes it difficult to quantify reliably. Therefore in this application the average molecular weights of polymers are determined by determining the average molecular weight of the primary polymer chains. This means that the primary polymer chains are formed under similar polymerisation conditions than used for forming branched or crosslinked polymer but in the absence of the branching or crosslinking agent. Hence, in this context the average molecular weight values for structured polymers, e.g. branched and/or cross-linked polymers, refer to the molecular weights of the corresponding linear primary polymer chains. The average molecular weight of the primary polymer chains are determined by using conventional methods known as such, for example intensity light scattering, or by using intrinsic viscosity, calibrated with intensity light scattering, if the conversion coefficients for intrinsic viscosity to molecular weight are known.

According to one embodiment of the invention the reverse phase emulsion polymer has a ratio of bulk viscosity to standard viscosity, BV/SV ratio, in the range from 125 to 550, preferably from 150 to 500. The ratio of bulk viscosity to standard viscosity describes the degree of structuring, e.g. branching and/or cross-linking, present in the cationic polymer. The bulk viscosity, BV, of a polymer is defined as the viscosity of a 0.2 weight % solution of polymer in pure water, measured using a rotating cylinder viscometer, such as Brookfield viscometer. Standard viscosity, SV, of a polymer is defined as the viscosity of a 0.1 weight % solution of polymer in 1 M NaCl solution, measured using a rotating cylinder viscometer, such as Brookfield viscometer. It has been observed that water-soluble hydrogel polymers, which have the above-defined BV/SV ratio, provide hydrogel polymer products that are superior flocculants for suspended solids in various water treatment processes. For example, these hydrogel polymer products provide fast dewatering of waste activated sludge, in particular extended aeration activated sludge.

According to one embodiment of the invention the cationic reverse phase emulsion polymer is added in an amount of >5 weight %, preferably >10 weight %, more preferably >15 weight %, calculated from the weight of dry hydrogel polymer. For example, the amount of cationic reverse phase emulsion polymer may in the range of 5-50 weight %, preferably 10-40 weight %, more preferably 15-30 weight %, calculated from the weight of dry hydrogel polymer. By adjusting the amount of the cationic reverse phase emulsion polymer it is possible to effectively adjust the cross-linking properties of the final polymer product.

The reaction mixture comprising ethylenically unsaturated monomers is polymerised in presence of water and initiator(s) by free radical polymerisation. The polymerisation may be performed as a batch process or a continuous process.

In the continuous process, where reaction mixture is transferred during the polymerisation in a reaction apparatus, such as a belt conveyor, screw extruder or a tubular reactor. The reaction mixture comprising the ethylenically unsaturated monomers and initiator(s) are introduced to the reaction apparatus near or at the first end/inlet of the reaction apparatus and the reaction mixture proceeds, while the polymerisation reaction is taking place, towards the second end/outlet of the reaction apparatus. A hydrogel polymer is removed from the reaction apparatus at the second end/outlet of the reaction apparatus. The reaction time may be adjusted by adjusting the forward feeding speed of the reactor apparatus. Preferably the residence time in the reactor apparatus is selected such that a 99% conversion is obtained before the second end/outlet of the reaction apparatus. Generally, the polymerization reaction reaches required conversion degree within 30-200 minutes. The radical polymerisation may be performed in air or in an inert atmosphere.

In a batch process, the reaction mixture polymerises in a reaction apparatus, such as a drum or a batch reactor. The reaction mixture comprising the ethylenically unsaturated monomers and initiator(s) are introduced to the reaction apparatus in an inert atmosphere, and the polymerisation takes place. The residence time in the reaction apparatus may vary between 40 and 240 min. The residence time may be adjusted by adjusting the initiator dosage. At the end of the polymerisation a hydrogel polymer is removed from the reaction apparatus.

According to one embodiment of the invention the reaction mixture may comprise an ethylenically unsaturated monomer of one type, or it may preferably comprise two or more different monomers. The hydrogel polymer may thus be a homopolymer or preferably a copolymer of at least two monomers. According to one preferable embodiment of the invention the reaction mixture comprises cationic monomers and non-ionic monomers. For example, the cationic hydrogel polymer may be a homopolymer having recurring units of one cationic monomer or a copolymer polymerised by using at least two different monomers, of which at least one is cationic. Preferably, one or more non-ionic monomers, e.g. acrylamide, may be copolymerised with one or more cationic monomers, e.g. acryloyloxyethyltrimethylammonium chloride, to produce cationic hydrogel copolymer. According to one embodiment the cationic hydrogel copolymers comprise at least 10 mol %, preferably at least 20 mol %, more preferably at least 40 mol % of recurring units of cationic monomer(s), based on the total number of moles of recurring units in the polymer. The cationic hydrogel copolymers comprise typically ≤80 mol % of recurring units of cationic monomer(s), based on the total number of moles of recurring units in the polymer.

According to one embodiment of the invention the cationic hydrogel copolymer has a standard viscosity of >2 mPas, preferably >3 mPas. The standard viscosity, SV, values are measured as a 0.1 weight % polymer solution in 1 M NaCl at 25° C. using a Brookfield viscometer.

Suitable ethylenically unsaturated non-ionic monomers that may be employed in the process are, for example, acrylamide and its derivatives; methacrylamides; N-alkylacrylamides, such as N-methylacrylamide; and N,N-dialkylacrylamides, such as N,N-dimethylacrylamide.

Suitable cationic monomers that may be employed in the process are selected, for example, from diallyldimethylammonium chloride (DADMAC); methacryloyloxyethyltrimethylammonium chloride; acryloyloxyethyltrimethylammonium chloride; methacrylamidopropyltrimethylammonium chloride; acrylamidopropyltrimethylammonium chloride; diallyldimethylammonium chloride; dimethylaminoethyl acrylate; dimethylaminoethyl methacrylate; dimethylaminopropylacrylamide; dimethylaminopropylmethacrylamide; or a similar monomer. According to one preferred embodiment of the invention cationic polyacrylamide is copolymer of acrylamide or methacrylamide with methacryloyloxyethyl-trimethyl ammonium chloride. Cationic polyacrylamide may also contain other monomers, as long as its net charge is cationic and it has an acrylamide/methacrylamide backbone. An acrylamide or methacrylamide based polymer may also be treated after the polymerisation to render it cationic, for example, by using Hofmann or Mannich reactions.

Total monomer concentration of the reaction mixture is typically 20-70 weight %, preferably 30-55 weight %, sometimes 30-40 weight %.

Further, reaction mixture comprises normally at least one initiator, which initiates the free radical polymerisation process, such as UV-sensitive initiator, temperature sensitive (thermal) initiator or redox initiator. The initiator may be organic or inorganic. Suitable polymerisation initiators are known to those skilled in the art. Typical organic initiators include, for example, various azo-compounds, whereby water-soluble azo-compounds are being preferred. Examples of suitable organic initiators are such as 2,2'-azo-bis(isobutyronitrile), 4,4'-azo-bis(4-cyanopentanoic acid) 2,2'-azo-bis(N,N'-dimethylene iso-butyramidine) dihydrochloride; 2,2'-azobis (2-amidinopropane) dihydrochloride and 2,2'-azobis [2-methyl-N-(2-hydroxyethyl) propionamide]. Other possible initiators include potassium persulfate and peroxides, such as t-butyl hydroperoxide. It is also possible to use redox systems as an initiator, for example t-butylhydroperoxide and sodium bisulphite. A further example of possible redox initiators are ammonium persulphate and ferrous ammonium sulphate, which can be used as aqueous solutions. Combinations of azo-initiators and redox initiator systems are also possible. Other useful initiators are various heavy-metal activated catalyst systems. Typically initiator(s) is/are used in amount of 0.0001-0.5 weight %, calculated from the total weight of the monomers.

It is also possible to add or use further reagents during the preparation process such as chain transfer agents, buffers, diluents, derivatizing agents and cross-linking agents.

The free radical polymerisation of monomers produces a hydrogel polymer, which is in gel form or in form of a highly viscous liquid.

The hydrogel polymer is comminuted by chopping or shredding. Depending on the used reaction apparatus, shredding or chopping may be performed in the same reaction apparatus where the polymerisation takes place. For example, polymerisation may be performed in a first zone of a screw mixer, and the shredding of the obtained polymer is performed in a second zone of the said screw mixer. It is also possible that the shredding, chopping or other particle size adjustment is performed in a treatment apparatus, which is separate from the reaction apparatus. For example, the obtained hydrogel polymer may be transferred from the second end of a reaction apparatus, which is a belt conveyor, through a rotating hole screen or the like, where it is shredded or chopped into small particles.

A lubricant may be added during comminuting the hydrogel polymer in order to enhance the cutting or shredding process. The reverse phase emulsion polymer may be added simultaneously, before and/or after the addition of the lubricant. The reverse phase emulsion polymer may be added, either as such or after dilution to an appropriate concentration, by spraying, pumping or by gravitation.

According to one preferred embodiment of the invention the reverse phase emulsion polymer is added at comminuting step without addition of a lubricant. It has been observed that the reverse phase emulsion may act as a lubricant.

After shredding or chopping the comminuted hydrogel polymer is dried, milled to a desired particle size and packed for storage and/or transport. The hydrogel polymer product typically has a particle size of 0.1-2 mm.

The process may further comprise a number of other post-treatment steps such as pelletizing and/or sieving. It is also possible to add or use further reagents, such as buffers and diluents.

According to one preferred embodiment the dry cationic hydrogel polymer product, prepared according to the method according to the present invention is useful for sludge dewatering. The obtained cationic polymer product may also be useful as a treatment chemical, such as a flocculant, in industrial water treatment processes, for treating municipal sludge, as well as in treating mining sludges and/or waters. The obtained cationic polymer composition may also be useful in pulp and paper manufacturing. The uses and applications here mentioned are not to be understood as restrictive or limiting examples. On the contrary, it is contemplated that the dry cationic hydrogel polymer product may be useful in vast variety of different applications, even those which are not explicitly mentioned here.

EXPERIMENTAL

Some embodiments of the invention are more closely described in the following, non-limiting examples.

Reference Example 1

Production of Reference Polymer 1

Cationic polyacrylamide gel was made by adiabatic redox polymerisation. The resulting polymer gel was dried and used as a reference. The charge density of Polymer 1 is 49 mol %, and the standard viscosity is 3.9 mPas.

Example 2

Production of Dry Cationic Hydrogel Polymer Product

Dry cationic hydrogel polymer product comprising Polymer 1 and Polymer 2 was prepared. Polymer 1 is the same as in Example 1 and Polymer 2 is a cationic reverse phase emulsion polymer having charge density of 55 mol % and high branching degree, defined by BV/SV ratio of 330. The ratio of Polymer 1 to Polymer 2 was 90:10 w/w.

The production process was as follows: a portion of the undried hydrogel polymer prepared according to Example 1 is chopped and ground in a grinder (LM-10/P, Koneteolisuus Oy, Finland). Polymer 2 is added to the ground gel, and the mixture is mixed with an overhead stirrer for 1 minute at mixing speed of 300 rpm. The resulting product is dried in 60° C. oven. The dry product is milled with a Retsch mill and sieved to obtain consistent particle size fractions. The fraction with the particle size of 0.5-1 mm is used in performance trials.

Example 3

Production of Dry Cationic Hydrogel Polymer Product

Dry cationic hydrogel polymer product comprising of Polymer 1 and Polymer 2 in ratio 80:20 w/w is prepared in a similar manner as described in Example 2.

Example 4

Production of Dry Cationic Hydrogel Polymer Product

Dry cationic hydrogel polymer product comprising of Polymer 1 and Polymer 2 in ratio 70:30 w/w is prepared in a similar manner as described in Example 2.

Example 5

Performance Trial

The dry polymer product of Example 3 was tested using a general procedure with Free Drainage Test measurement as follows: 2 g of a dry polymer product is dissolved in 998 g of deionized water with 1 hour of gentle mixing to make a 0.2 weight % test solution, which was used in the experiment within the same day.

The Free Drainage test experiment was conducted using digested municipal sludge from waste water treatment plants WWTP1 (RWZI Kralingseveer, Rotterdam, Netherlands) and WWTP2 (RWZI Harnaschpolder, Den Haag, Netherlands). The dry solids concentration (DS) of the sludge was measured by drying 5 g of the sludge at 105° C. in an air circulatory oven for overnight and it was 3.8 weight % for WWTP1 sludge, and 3.7 weight % for WWTP2 sludge.

The polymer product dose in the experiment is defined as "kg/t", where the "kg" refers to the mass of dry polymer product in kilograms, dosed as 0.2% solution and the "(t)" to the mass of $10^3$ kg of dry sludge solids. A single measurement point of the Free Drainage test experiment, presented in Tables 1 and 2, was collected in a following way: A volume of the 0.2 weight % polymer product solution was dosed into a 200 ml still sludge sample. The sample was mixed with an overhead stirrer for 10 seconds at 1000 rpm after which the mixed sample was poured to the free drainage funnel. The flocculation and dewatering power of a composition is evaluated in comparison of the Free Drainage volume after 5 s drainage time. Dried Polymer 1 from Example 1 and SD-2081 (Kemira Oyj, degree of branching—low, charge density—high, molecular weight—high) are used as references.

TABLE 1

Measurement results of Free Drainage Test experiments for dry polymer product of Example 3 with WWTP1 sludge. Optimum performance of the products.

| Product | Optimum dosage (kg/tDS) | Free drainage volume after 10 s |
|---|---|---|
| Example 3 | 19 | 134 |
| Polymer 1 (reference) | 13 | 93 |
| SD-2081 | 18 | 127 |

TABLE 2

Measurement results of Free Drainage Test experiments for dry polymer product of Example 3 with WWTP2 sludge. Optimum performance of the products.

| Product | Optimum dosage (kg/tDS) | Free drainage volume after 5 s |
|---|---|---|
| Example 3 | 12 | 110 |
| Polymer 1, ref | 13 | 86 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for preparing a dry cationic hydrogel polymer product, the method comprising
   polymerising a reaction mixture comprising ethylenically unsaturated monomers in presence of water and initiator(s) by radical polymerisation and obtaining a hydrogel polymer,
   comminuting the hydrogel polymer by chopping or shredding, and
   drying the hydrogel polymer, to obtain a dry hydrogel polymer product in powder form,
   wherein at least one cationic reverse phase emulsion polymer is added to the hydrogel polymer at the comminuting step.

2. The method according to claim 1, wherein the cationic reverse phase emulsion polymer is added in an amount of >5 weight-%, calculated from the weight of dry hydrogel polymer.

3. The method according to claim 1, wherein the cationic reverse phase emulsion polymer is cationic polyacrylamide having a charge density of 10-80 mol-%.

4. The method according to claim 1, wherein the reverse phase emulsion polymer is cationic branched and/or cross-linked polyacrylamide, where the amount of cross-linker agent is <500 ppm, calculated from the total weight of the used monomers.

5. The method according to claim 1, wherein the reverse phase emulsion polymer has a ratio of bulk viscosity to standard viscosity, i.e. BV/SV ratio, in the range from 125 to 550.

6. The method according to claim 1, wherein the reverse phase emulsion polymer is added at comminuting step without addition of a lubricant.

7. The method according to claim 1, wherein the ethylenically unsaturated monomer is selected from the group consisting of acrylamide, methacrylamides, N-alkylacrylamides, and N,N-dialkylacrylamides.

8. The method according to claim 1, wherein the reaction mixture comprises cationic monomers.

9. The method according to claim 8, wherein the cationic monomers are selected from the group consisting of diallyldimethylammonium chloride (DADMAC); methacryloyloxyethyltrimethylammonium chloride; acryloyloxyethyltrimethylammonium chloride; methacrylamidopropyltrimethylammonium chloride; acrylamidopropyltrimethylammonium chloride; dimethylaminoethyl acrylate; dimethylaminoethyl methacrylate; dimethylaminopropylacrylamide; and dimethylaminopropylmethacrylamide.

10. A method for dewatering a sludge originating from a wastewater treatment process, the method comprising
- polymerising a reaction mixture comprising ethylenically unsaturated monomers in presence of water and initiator(s) by radical polymerisation and obtaining a hydrogel polymer,
- comminuting the hydrogel polymer by chopping or shredding,
- drying the hydrogel polymer, to obtain a dry hydrogel polymer product in powder form, and
- dosing the dry hydrogel polymer to the sludge to obtain dewatered sludge, wherein at least one cationic reverse phase emulsion polymer is added to the hydrogel polymer at the comminuting step.

* * * * *